(12) United States Patent
Lakhamraju et al.

(10) Patent No.: US 6,343,296 B1
(45) Date of Patent: Jan. 29, 2002

(54) ON-LINE REORGANIZATION IN OBJECT-ORIENTED DATABASES

(75) Inventors: Mohana Krishna Lakhamraju, Berkeley, CA (US); Rajeev Rastogi, New Providence; Srinivasan Seshadri, Basking Ridge, both of NJ (US); Sundararajarao Sudarshan, Mumbai (IN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/389,337

(22) Filed: Sep. 3, 1999

(51) Int. Cl.[7] ........................... G06F 17/30; G06F 15/00
(52) U.S. Cl. ........................... 707/103; 707/8; 707/102; 712/222
(58) Field of Search ................................ 707/103, 104, 707/102, 101, 206, 8; 712/222

(56) References Cited

U.S. PATENT DOCUMENTS

| | | | | |
|---|---|---|---|---|
| 5,509,131 A | * | 4/1996 | Smith et al. | 395/416 |
| 5,701,470 A | * | 12/1997 | Joy et al. | 707/103 |
| 5,881,379 A | * | 3/1999 | Beier et al. | 707/101 |
| 5,933,820 A | * | 8/1999 | Beier et al. | 707/1 |
| 5,956,718 A | * | 9/1999 | Prasad et al. | 707/10 |
| 6,009,476 A | * | 12/1999 | Flory et al. | 709/301 |
| 6,035,391 A | * | 3/2000 | Isaman | 712/222 |
| 6,049,797 A | * | 4/2000 | Guha et al. | 707/6 |
| 6,092,072 A | * | 7/2000 | Guha et al. | 707/101 |
| 6,122,640 A | * | 9/2000 | Pereira | 707/103 |
| 6,144,970 A | * | 11/2000 | Bonner et al. | 707/206 |

OTHER PUBLICATIONS

Habbash et al., Towards an Rfficient Management of Objects in a Distributed Environment, 1990, IEEE, pp. 181–190.*
Ammann, Inter–Module Renaming and Reorganizing: Examples of Program Manipulation in the–Large, 1994, IEEE, pp. 354–361.*
King et al., Self–Adaptive, On–Line Reclustering of Complex Object Data, 1994, ACM, pp. 407–418.*

(List continued on next page.)

Primary Examiner—Frantz Coby (57) ABSTRACT

An on-line reorganization method of an object-oriented database with physical references involves a novel fuzzy traversal of the database, or a partition thereof, to identify the approximate parents of all migrating objects. Where the entire database is traversed the process begins from its persistent root. For traversals of a partition the process begins from each object with a reference pointing to it from outside the partition. To facilitate the identification of these inter-partitional objects an External Reference Table ("ERT") is maintained. During the fuzzy traversal all new inserted and deleted references are tracked in a Temporary Reference Table ("TRT"). After the fuzzy traversal is completed, for each migrating object, a lock is obtained on the identified approximate parents and on all new parents in which references to the object were inserted, as indicated by the TRT. Based on the information in the TRT, locks are released on all approximate parents whose references to the object have been deleted. The references to the migrating object in the remaining set of locked parents are updated, the object is relocated and the locks are released. Alternatively, each parent of a migrating object can be individually locked, updated and released.

18 Claims, 6 Drawing Sheets

OTHER PUBLICATIONS

E.K. Kolodner and W.E. Weihl, "Atomic Incremental Garbage Collection and Recovery of a Large Stable Heap," In Proceedings of ACM SIGMOD International Conference on Management of Data, pp. 177–186, (May 1993).

L. Amsaleg, M. Franklin, and O. Gruber, "Efficient Incremental Garbage Collection for Client–Server Object Database Systems" In Proceedings of the 21st VLDB Conference (Sep., 1995) pp. 42–53.

S. Ashwin, et al., "Garbage Collection in Object Oriented Databases Using Transactional Cyclic Reference Counting" In Proceedings of the 23rd VLDB Database Conference (Aug., 1997) pp. 1–34.

* cited by examiner

FIG. 1

```
Incremental_Reorganization(P) {
    (Objects, Parent_Lists) = Find_Objects_And_Approx_Parents(P)
    For (each object O_old in the set Objects) do
        Find_Exact_Parents(O_old, Parent_Lists)
    Move_Object_And_Update_References(O_old, Parent_Lists)
}
```

FIG. 2

```
Find_Exact_Parents(O_old, Parent_Lists) {
S1: Get Write Locks on all the objects in the parent list of O_old
    For each object R in the parent list of O_old
        If R is not a parent of O_old
            Unlock R, and remove R from parent list of O_old
S2: While (∃ a tuple t in the TRT which has O_old as the referenced object)
        Write lock the parent object R of O_old in t
        Delete t from TRT
        If R is a parent of O_old
            Add R to the parent list of O_old
    else Unlock R
}
```

FIG. 3

```
Move_Object_And_Update_References(O_old, Parent Lists) {
    Copy O_old to the new location, say O_new
    For each parent R in the parent list of O_old
        Change the reference in R to point to O_new
        Update ERTs of the partitions where O_old and O_new reside to reflect the change
    For each child C of O_old that is in the partition being reorganized
        If C is not yet migrated
            Replace O_old by O_new in the parent list of C
    For each child C of O_new
        Update the ERT of the partition corresponding to C to reflect the migration
    delete O_old
    Unlock all the parents of O_old (O_new)
}
```

FIG. 4

```
Incremental_Reorganization(P) {
    (Objects, Parent_Lists) = Find_Objects_And_Approx_Parents(P)
    For (each object O_old in the set Objects) do
        Lock O_old and O_new (the new location)
        Move O_old and O_new
        For each object R in the parent list of O_old
            Lock R
            If R is a parent of O_old
                Change the reference to O_old in R to O_new and update ERTs
                of partitions corresponding to O_old and O_new to reflect this change
            Unlock R
        While ( ∃a tuple t in the TRT which has O_old as the referenced object)
            Lock R
            If R is a parent of O_old
                Change the reference to O_old in R to O_new and update ERTs
                of partitions corresponding to O_old and O_new to reflect this change
            Unlock R
        Replace O_old with O_new in parent lists of objects yet to be migrated
        For each child of O_new
            Update the ERTs of the partitions corresponding the child to reflect the migration
        Unlock O_old and O_new
{
```

ON-LINE REORGANIZATION IN OBJECT-ORIENTED DATABASES

FIELD OF THE INVENTION

The present invention relates generally to reorganization in object oriented databases. More specifically the present invention relates to a method for updating physical references to objects without interfering with executing applications.

BACKGROUND OF THE INVENTION

In an object oriented database data records, referred to as objects include reference pointers to other objects. In some systems these pointers are physical references, while other systems use logical references. A physical reference is an actual location, or address on a storage medium, where the referred to objects can be found. Logical references are object identifiers, unique for that object and independent of the physical location of the record.

By analogy, the address of a residence is a physical reference to an individual residing there. As long as the individual remains at that address, anyone visiting that address will find him. However, the same individual may move and no longer be associated with that address, in which case the address will exist, but the individual will not be found. Indeed, another individual may reside there.

In contrast, a social security number is a logical reference to an individual. No one else will receive the same number and the individual number, under ordinary circumstances will not change. However, the social security number alone does not indicate where to physically find the individual.

Since objects in an object oriented database are interrelated through references, it is necessary to traverse one or more and often many, intermediate objects, before reaching a particular object. If any of the intermediate objects cannot be reached then all subsequent objects will be unreachable. Thus it is imperative to keep track of all object migration, i.e., all physical relocations of an object.

The process of relocating, or migrating objects and updating the references to them, whether the references are physical or logical, is referred to as reorganization. Reorganization of objects in an object-oriented database is well known in the art and is an important component of several utilities like compaction, clustering, partitioning and schema evolution.

Compaction reduces fragmentation of various length objects, resulting from continuous allocation and de-allocation of space for these objects, by migrating objects to different locations and packing them closely. Clustering involves locating related objects within the same disk block or adjacent blocks. As a result the performance of transactions which access those sets of objects within a small time frame, is improved. In contrast to clustering, partitioning separates objects across several disks to enable concurrently accessed objects to be retrieved in parallel. Clustering and partitioning of objects is determined based on changes in workload and updates to objects. Schema evolution often requires objects to be moved since an object may not fit in its current location due to a size change caused by schema evolution.

When physical references are used each reference to an object, which may be many, must be updated whenever the object is physically relocated. For example, one prior art method of updating an object-oriented database with physical references maintains back pointers from every object in the database. In this manner, before an object is relocated, the back pointer enables quick and easy updating of the reference to the migrating object. However, maintaining back pointers greatly increases storage overheads and causes lock contention in back pointer lists of "popular" objects, which are pointed to from many parent objects. Thus, maintaining back pointers is unacceptable in many applications.

Logical references on the other hand, do not require updating since the logical reference is independent of the physical location of the object. However, the data record itself is not found merely from the logical reference. Rather a mapping procedure is executed to return the physical location of an object. It is only the one cross reference in the map that requires updating when an object is moved from one physical location to another.

Clearly, updating one cross reference in a map is more desirable than determining every physical reference to a relocated object. Indeed, where the cost of reorganization is of concern, one solution found in the prior art is to use logical references. However, while logical references require only one update for each relocated object, they entail one extra level of indirection for every access of the object, i.e. mapping. In a memory resident database, this increases the access path length to an object by a factor of two, and may also considerably increase main-memory requirements. These overheads are unacceptable in a number of scenarios such as call setup in telecommunications, which require response times to be in the order of hundreds of microseconds.

Even where the cost of physical references is acceptable over logical references, another issue must be addressed: that of concurrent transactions. The concern is that between the actual migration of an object and updating all physical references, an application that has been running may have retrieved the old reference. In other words, assume an object O points to location X for object O' and O' is relocated to location Y. While the pointer from O will be updated to point to Y, the concern is that immediately prior to updating the pointer at O, an application will have already retrieved the old pointer, stored it in its local memory and will follow the pointer to X, looking for O'.

One approach to this problem is to access the local memory of the application and actually change the physical reference whenever the referred to object has moved to another location. This requires an action-quiescent state during which all objects in the memory of active transactions and persistent roots are copied into a new space. This method, however, works only when the database manager has low level support from the hardware and operating systems including access to the local memory of the application. For example, the system must be able to change references in the registers and stacks of active transactions and trap certain pointer references using memory protection. Often times this is not available. For example, windows based systems do not allow access to this low level memory. In addition, those techniques use forwarding addresses which may require an extra I/O and require use of a complicated failure recovery technique to ensure consistency of the disk version of the database. See E. K. Kolodner and W. E. Weihl, "*Atomic Incremental Garbage Collection and Recovery of a Large Stable Heap,*" In Proceedings of ACM SIGMOD International Conference on Management of Data, pages 177–186, (Washington, D.C., May 1993), hereby incorporated by reference as if fully set forth herein.

Another approach is to find the set of parent objects with a reference to a migrating object O, lock them so they are unavailable to the application and update the reference in each parent object. The transaction locks the object, either with a read lock, thereby preventing any other application from reading the object, or with a write lock, allowing reading, but preventing any deletion or insertion of a reference contained within the object. Once a transaction has locked an object (in the appropriate mode), it can i) copy into its local memory any reference from that object to another; ii) delete a reference from that reference to another; and iii) copy a reference stored in its local memory into that object, so that the object now points to another object. In all of the above, the transaction is not required to hold a lock on the object to which the reference points.

Traditionally, the application effecting the migration of an object will lock out all transactions from the entire database. This is referred to as off-line reorganization. Finding the parents of O with off-line reorganization is accomplished by traversing an object graph of the database. An object graph is a well known system model of an object-oriented database and has been used to analyze issues different from those addressed herein. See e.g., L. Amsaleg, M. Franklin, and 0. Gruber, "*Efficient Incremental Garbage Collection for Client-Server Object Database Systems,*" In Proceedings of the 21$^{st}$ VLDB Conference (September 1995); S. Ashwin, et al., "*Garbage Collection in Object Oriented Databases Using Transactional Cyclic Reference Counting,*" In Proceedings of the 23$^{rd}$ VLDB Database Conference (Athens, Greece, August, 1997), hereby incorporated by reference as if fully set forth herein.

Figure 8:
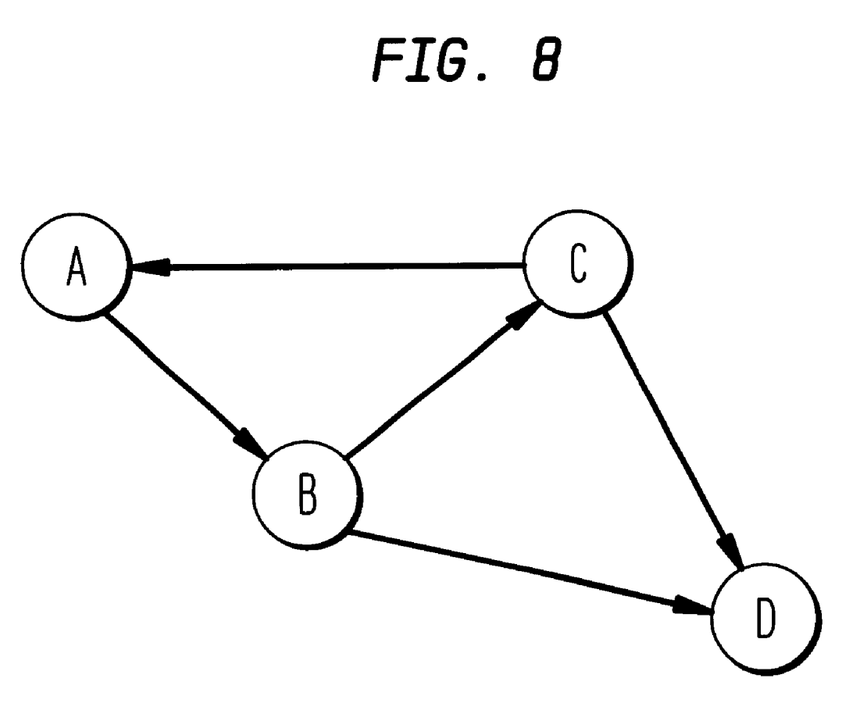
FIG. 8 illustrates a model object graph.

Referring to FIG. 8, a model of an object graph is shown where the objects in the database form a directed graph. The nodes of the graph are the objects in the database, and an edge, for example from A to B as shown (generically from R to O) exists in the graph if and only if object R contains a physical reference to object O. The term "reference" is used herein to mean both the object identifier of another object, as well as the edges in the object graph, i.e., a reference from some object R to an object O. It will be clear from the context which usage is intended. Objects R which contain a reference to an object O are known as the parents of O and O is said to be a child of R.

Traversing the object graph of the database begins with a persistent root, which is a special object found in each database and may be node A in FIG. 8. All objects in the object graph that are reachable either from a persistent root, or from an object whose reference is in the local memory of an active transaction are live objects. All other objects in the database are said to be "garbage" since without a reference to them they cannot be reached. In FIG. 8 there are no garbage objects. B is reachable from A. C is reachable from B. D is reachable from B and C.

Thus with off-line reorganization there is no concern that an application retrieved the old reference and will no longer find the correct object, since no application is allowed to run during migration of an object and updating of the references to it. In today's world, however, off-line reorganization is becoming less of an option since information systems are requiring twenty four hours a day, seven days a week operation. Going off-line may present an intolerable situation. This is especially true of with global corporations spanning multiple time zones where there is no appropriate low activity time during which reorganization can be performed. Since off-line reorganization has been the only alternative available, conventional wisdom states object migration can be very disruptive to normal processing if physical references are used.

Consequently, there is a need in the field of object oriented databases for a method of online reorganization, allowing as many concurrent transactions as is possible. Moreover, it is desirable that such a system be less expensive than heretofore known and advantageously allow for the use of physical references, thus eliminating the look up costs associated with logical references. In addition, it would be desirable to have such a reorganization method where interference with low level applications is minimized or eliminated altogether. Such a method would advantageously allow applications to continue their operations during any physical relocation of objects.

SUMMARY OF THE INVENTION

Using a new Incremental Reorganization Algorithm ("IRA") in an object-oriented database with physical references, on-line reorganization with minimal interference to concurrently executing transactions is performed. Initially, the database is traversed with a single fuzzy traversal beginning with the persistent root of the database, to determine all approximate parents of each object being migrated. During the fuzzy traversal no objects are locked. Rather, a short latch is temporarily obtained as the references in an object are read. Thereafter, individually for each object, a set of exact parents is found and locked, their references to the migrating object are updated and the migrating object is moved. Accordingly, relatively few locks are held at any time, thus minimizing interference with concurrent transactions.

In a second embodiment of the present invention and with particular application for large databases, such as those in the order of gigabytes, where it is expensive to traverse the entire database in order to carry out reorganization, the database may be partitioned and the IRA of the present invention may be executed on one partition at a time. In this embodiment, an External Reference Table ("ERT") is maintained for each partition, listing the objects with at least one parent from another partition. The fuzzy traversal of a partition begins from each of the objects listed in that partition's ERT.

In a further embodiment of the present invention, with particular application in high performance situations, concurrency may be further improved by locking a migrating object one at a time and then individually locking, updating and releasing each exact parent until all exact parents have been updated. Thereafter, the migrating object is relocated and released. Thus, at most two locks are held at any point in time by this extension.

In all of the aforementioned embodiments a Temporary Reference Table ("TRT") may be employed for listing separately for each migrating object, a new reference or a deleted reference to that migrating object. This is important since no locks are obtained during the fuzzy traversal. All new references are updated as with the approximate parents. As for deleted references, approximate parents for which the TRT indicates the reference was deleted, need not be updated.

DETAILED DESCRIPTION OF THE INVENTION

Figure 5:
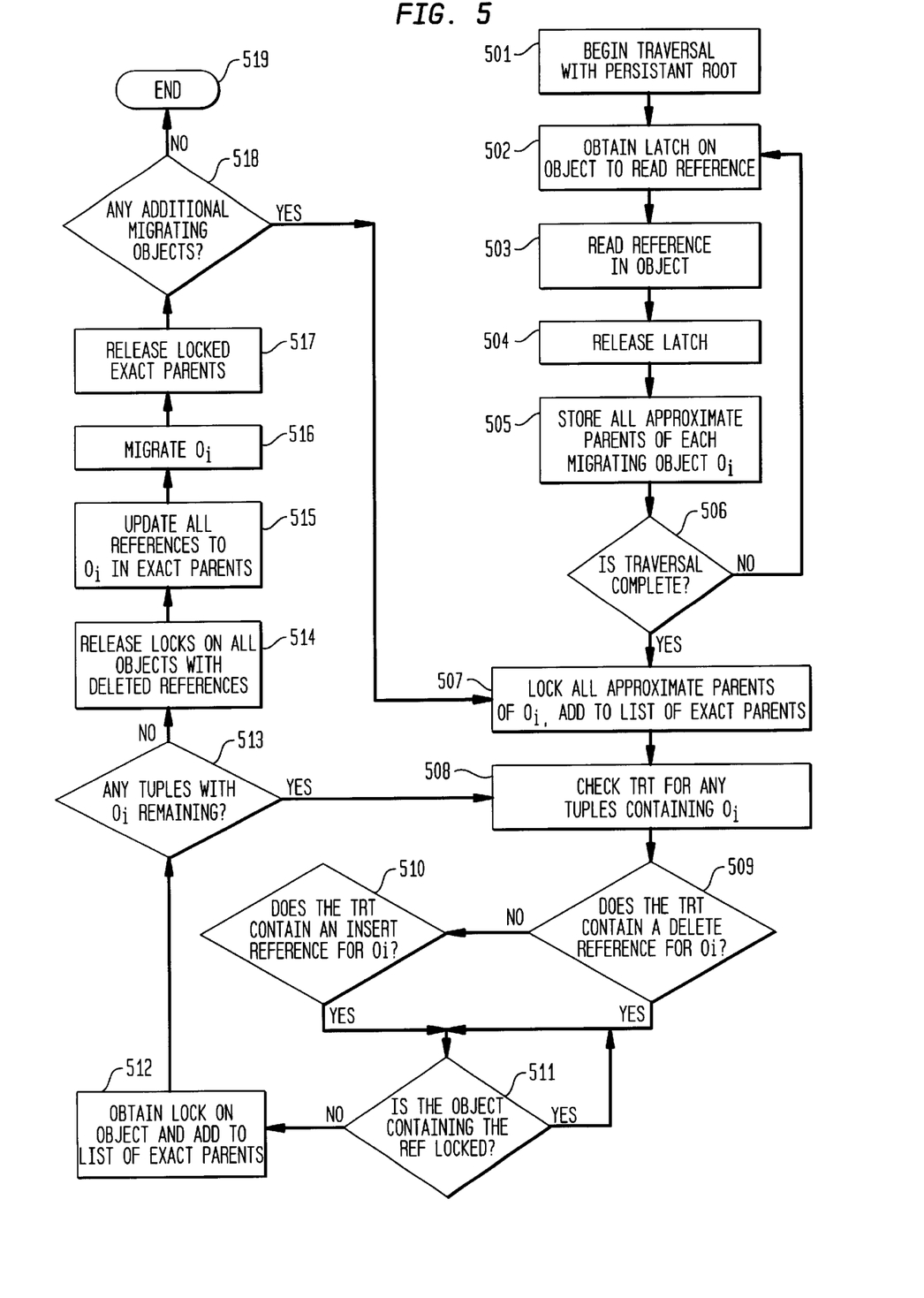
FIG. 5 is a flowchart of the basic steps performed in the on-line reorganization method of the present invention.

As mentioned above, one prior art method of updating physical references involved a traversal of the database to find the parents of migrating objects. As described in more detail below, the method of the present invention also involves a traversal of the database in which objects may be migrating. However, the method of the present invention is operable even where the database is partitioned into smaller constituent parts. Indeed, reorganizing a partition is especially advantageous when the database is large and the migrating objects can be found within one or more partitions, but not throughout the database. Given an object identifier, the partition to which the migrating object belongs can be found inexpensively and reorganization can be restricted to that partition. For example, the partition could be inferred from a fixed number of left most bits of the object identifier. Thus, the applicability and operability of the present invention is independent of whether the database is partitioned.

Where reorganization is performed on an entire database, the traversal begins with the persistent root, as shown by block 501 in FIG. 5. Where reorganization is of a partition P, the traversal begins with all objects that are referenced by objects external to partition P. These externally referenced objects are listed in an ERT separately maintained for each partition. The ERT for a particular partition P stores all references from a parent R which is outside of partition P, to an object O within P. Thus, the ERT for partition P stores back pointers for references that come into P from other partitions. Objects O belonging to P that are noted in the ERT are called the referenced objects of the ERT. For simplicity of the following description, the persistent root is assumed to be in a partition of its own, so that references from the persistent root to an object in any partition, is in the corresponding partition's ERT. As with traversing an entire database, whenever an edge from R to O is traversed, R is added to the list of parents of O. Thus, in the case of a traversal of a partition, all parents from another partition which reference an object in P, which parents can be found in the ERT of partition P, are also added to the list of parents of O.

An alternative to traversal from the ERT is to take advantage of the information stored regarding the allocation of space of each object in the database. This way each object in a partition can be identified and visited during traversal. However, since information is maintained for each object to which space has been allocated, this method does not enable the detection of garbage objects since even garbage is store somewhere and consequently has allocated space.

We assume that the transactions follow the Write Ahead Logging Protocol WAL which logs an undo value to recreate the database as it existed before the transaction occurred and a redo value which allows reconstruction of the database if the system for example shut down before the update took place. The undo value is logged before actually performing an update, but the redo value may be logged anytime before the lock on the object in question is released. Since these logs are used to identify deleted and inserted references it is necessary that they exist before the pointer is actually deleted or inserted. Otherwise, the traversal may pass the parent before the pointer was actually deleted and not realize that it is no longer a parent of a particular object.

Phase One: The Fuzzy Traversal

Figure 1:
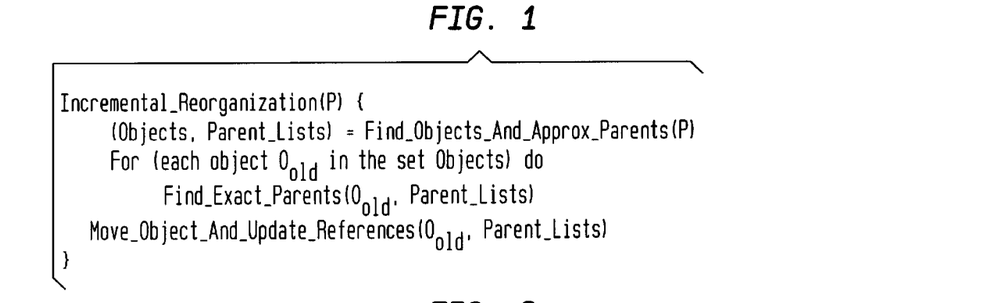
FIG. 1 illustrates the pseudocode for the overall incremental reorganization algorithm implemented in the on-line reorganization method of the present invention.

Referring to FIG. 1, an algorithm written in pseudocode is shown, which outlines the top level idea for on-line reorganization in accordance with the method of the present invention. This method as further described below and with reference to FIG. 5, allows transactions to execute on the partition, or database as assumed in the flowcharts of FIGS. 5–7, during reorganization. As shown, the first step is implemented by the function Find_Objects_And_Approx_Parents which returns a list of migrating objects and their corresponding approximate parents by performing a fuzzy traversal of the database or partition being reorganized, blocks 501 through 505. The term fuzzy traversal is used to indicate that the database or partition thereof being reorganized is not static. In other words, the parents of a migrating object can change during the traversal, since in accordance with the present invention, locks on the objects are not collected. For this reason, the parent list for each migrating object is only an approximation since some of the parents may have been deleted and new parents may have been inserted during the traversal. Instead of collecting locks, however, only a short term latch is obtained on a particular object while the references pointing out of that object are read, blocks 502 through 504. It should be noted that while separate traversals can be performed for each migrating object, advantageously, the parents of all migrating objects can be collected with a single traversal as, as shown in FIG. 5.

The Temporary Reference Table

Since parents may be inserted or deleted during the fuzzy traversal, a data structure called a Temporary Reference Table ("TRT"), is used to collect all inserted pointers and deleted pointers which occurred during the traversal. It is necessary to collect all inserted and deleted pointers in the TRT in order to properly reorganize the database or partition. With respect to inserted pointers it is easy to appreciate that a new parent R to a migrating object O may be inserted, either by adding a new object, or by adding a new reference in an existing object, after the fuzzy traversal passes that object. If R is not identified then O may be relocated without updating the reference in R which will continue to point to the old location for O. A transaction seeking O that reads the reference in R will be sent to the wrong location.

Similarly, assume that prior to reorganization a transaction deletes a pointer from R to O, but retains the reference to O in its local memory. When reorganization is performed R will not be recognized as a parent of O. Meanwhile O will be relocated. The problem will arise if the transaction aborts and reinserts the pointer from its local memory into R. Any later executing operation that reads R to reach O will be directed to the old location where O no longer exists. The TRT helps to avoid this problem by recording that a reference to O has been deleted. In accordance with the present invention the reorganization method will identify the deleted pointer from the TRT and attempt to lock R. If a lock cannot be obtained, it is because under two phase-locked protocol the transaction has not completed. If a lock on R is obtained then the transaction has completed. R can then be retrieved and examined for its pointer to O to determine if the deletion was confirmed or aborted. If the pointer was deleted than O is simply relocated. Otherwise R must also be updated.

Furthermore, if the only reference to a migrating object O is deleted by a transaction, O (and some of its descendants) may never be encountered during the fuzzy traversal. Again, if the transaction reinserts a reference to O after the fuzzy traversal, the reorganization will have failed to relocate O, notwithstanding it is a live object. By using the TRT to identify any deleted references which are reinserted the reorganization can accommodate by performing a fuzzy traversal from the reference that was reinserted. Thus, O (and all of its descendants) will be encountered during the traversal, and migrated.

The TRT contains tuples of the form (O, R, tid, action), where R is the referencer (parent) from which a reference to object O has been deleted or added by transaction tid; and action denotes whether the reference was inserted or deleted. A pointer delete must be noted in the TRT before the pointer is actually deleted by the transaction. Pointer inserts can be noted after the actual operation is done, but they should be made before the lock on the object in question is released.

The structure of the TRT is more fully described in L. Amsaleg et al., "Efficient Incremental Garbage Collection for Client-Server Object Database Systems," supra; and S. Ashwin, et al., "Garbage Collection in Object Oriented Databases Using Transactional Cyclic Reference Counting," supra, both of which are hereby incorporated by reference as if fully set forth herein. In addition, it should be noted that many mechanisms for maintaining the TRT and ERT are possible and a variety are known in the art, some of which are discussed in the Amsaleg and Ashwin references, cited above. The reorganization process, however, is independent of the type of maintenance mechanism employed.

Phase Two: Updating the Exact Parents

Figure 2:
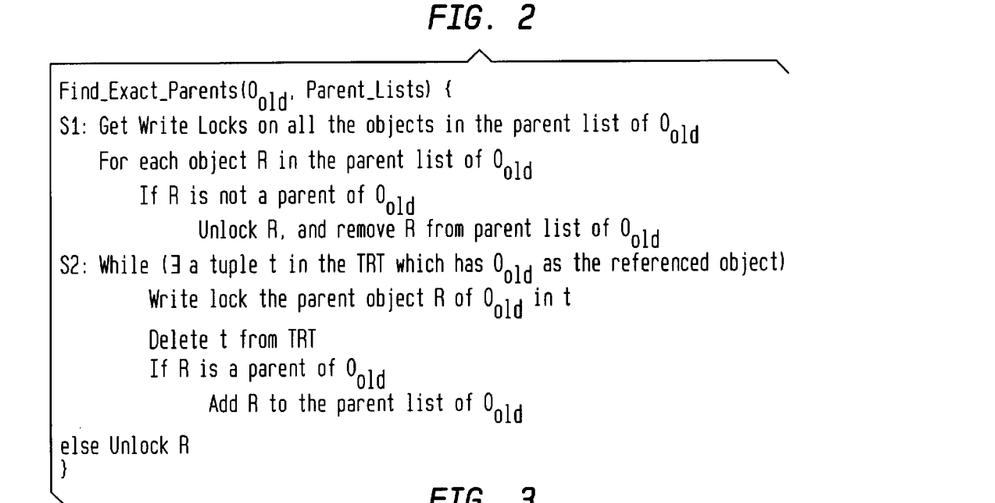
FIG. 2 illustrates the pseudocode for the function Find__Exact_Parents which is executed as the first step of the incremental reorganization algorithm shown in FIG. 1.

After collecting an approximation of the set of parents of a migrating object, the second step of the incremental reorganization of the present invention begins by locking the approximate parents of each migrating object $O_{old}$, block 507. Referring to FIG. 2, pseudocode for the function performing this second step, Find_Exact_Parents, is shown. This function first obtains locks on the approximate parents of $O_{Old}$, identified by the fuzzy traversal.

Find_Exact_Parents then checks the TRT for existence of a tuple containing $O_{old}$ as the referenced object, block 508. If a tuple exists, then a reference to $O_{old}$ from an object R has either been added or deleted. If a reference from R to $O_{old}$ has been deleted, the transaction that deleted the reorganization method of the present invention obtains a lock on that parent, blocks 508, 509, 510 and 511. Where the database is subject to two-phase locked ("2PL") constraint, the transaction will have completed when Find_Exact_Parents is able to obtain a lock on R. This indicates that object R is no longer a parent of $O_{old}$. R can then be unlocked and removed from the parent list of $O_{old}$. This is indicated by the loop over decision block 511.

Similarly, if a reference from R to $O_{old}$ has been added and R still contains that reference after a lock on R is obtained, then R is added to the parent list of $O_{old}$. The while loop in Find_Exact_Parents terminates when there is no tuple in the TRT that contains $O_{old}$ as the referenced object, block 513. Note that there is no need to obtain a lock on $O_{old}$ itself, since the only way to access it is via a parent, and due to the strict 2PL requirement, no transaction can have a lock on $O_{old}$ once all its parents are locked.

Relaxing the 2PL Requirement

Figure 6:
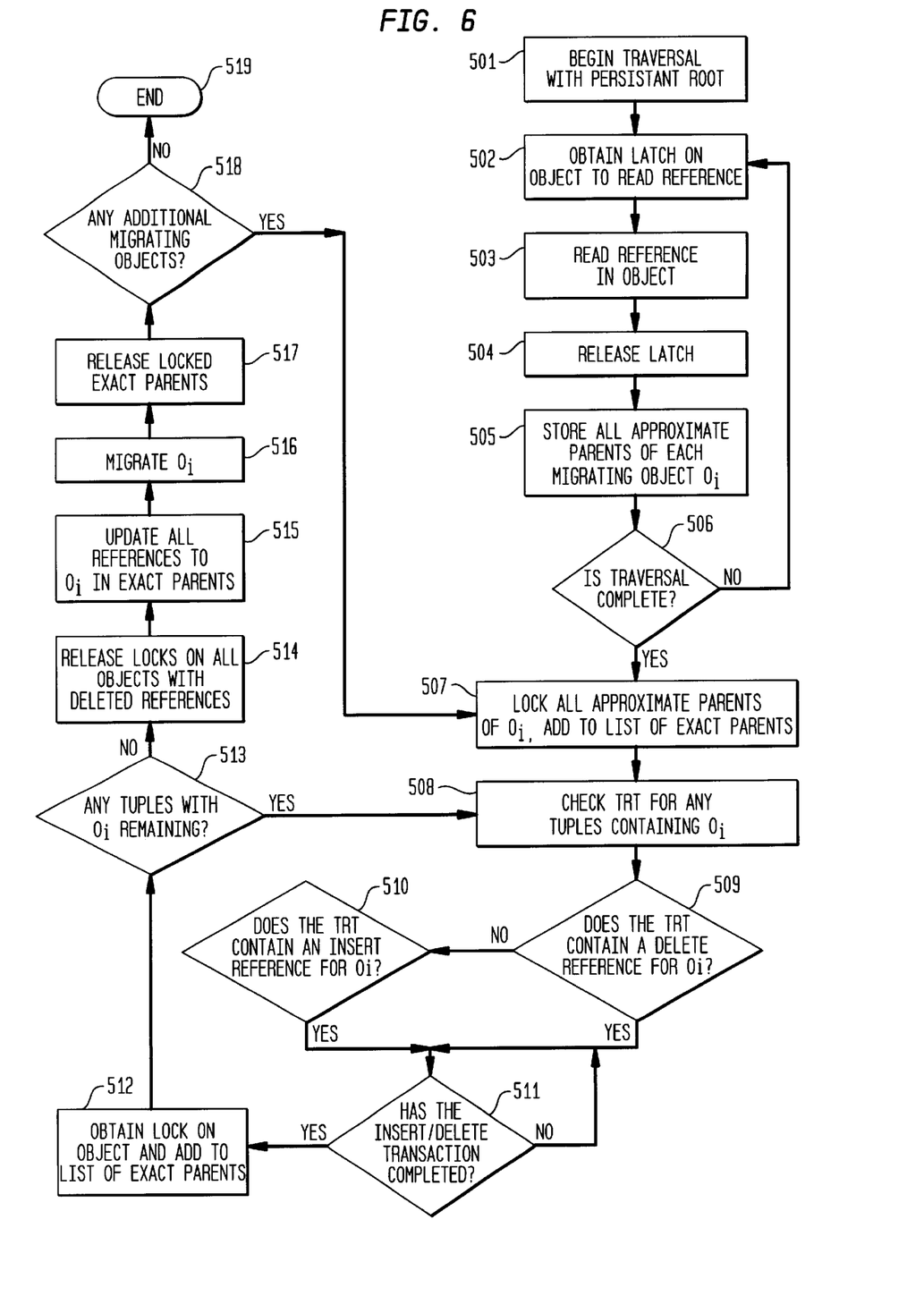
FIG. 6 is a flowchart of one embodiment of the present invention as implemented wherein strict 2PL is not followed.

With simple modification the process of finding the exact parents of a migrating object can be performed even in the absence of 2PL constraints. In the absence of 2PL, a transaction which deletes a reference, for example, does not have to maintain a lock on the reference until the transaction is confirmed or aborted. Rather, only a short duration lock, or latch is obtained for the time it takes the transaction to read the reference. In this instance, the lock manager is augmented to keep track of which active transactions had acquired latches on which objects. The Find_Exact_Parents function is modified to wait prior to obtaining a lock on an object, for all active transactions that ever acquired a latch on the object to complete the transaction. This is shown in FIG. 6, where the flowchart of FIG. 5 has been modified by replacing the decision block 511 with decision block 611. Thus, the reorganization process waits for transactions that may have copied a reference into its local memory but may not currently hold a lock on the source of the reference. This results in transactions behaving as though they were following strict 2PL with respect to the reorganization process.

At this point all parents of $O_{old}$ are locked prohibiting any transaction from obtaining any reference to $O_{old}$. The method is still considered on-line because transactions are allowed to access the database and lock any of the objects other than parents of the migrating object. Consequently, it is safe to move $O_{old}$.

Figure 3:
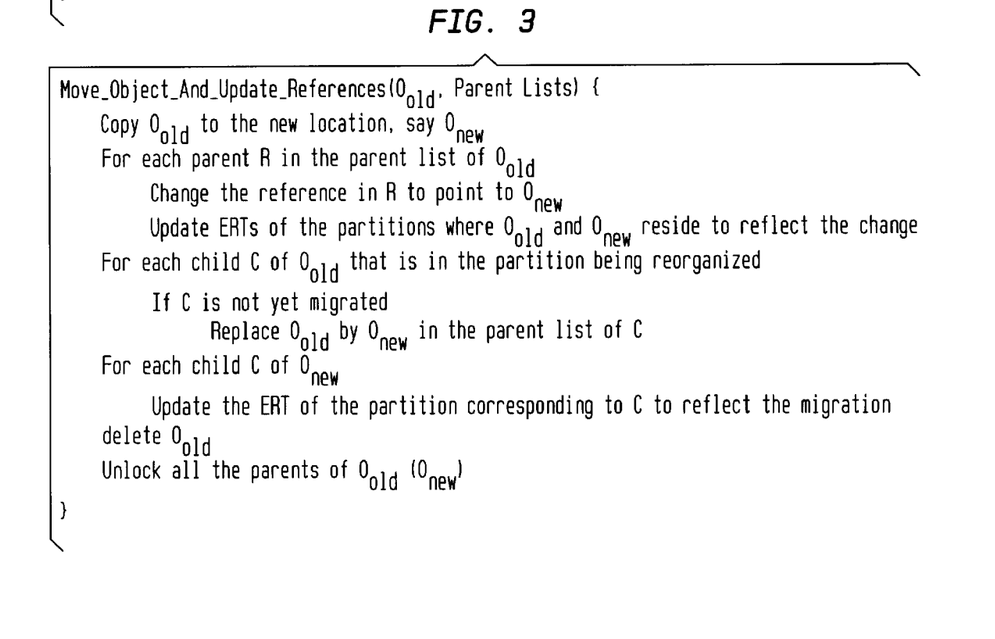
FIG. 3 illustrates the pseudocode for the function Move__Object__And__Update__References which is executed as the second step of the incremental reorganization algorithm shown in FIG. 1.

Referring to FIG. 3, the pseudocode for function Move_Object_And_Update_Reference is shown which executes the relocation of $O_{old}$. Move_Object_And_Update_References is essentially a bookkeeping function that actually effects the migration of $O_{old}$ and ensures all references to the object at the old location are first updated, block 515, to refer to the new location and then $O_{old}$ is migrated, block 516. Thereafter the locks are released, block 517, and the migrating object and its parents are all available for other transactions. The process continues until all migrating objects are relocated, blocks 518 and 519.

Reducing the TRT Overhead

Having explained the basic operation and interaction of the TRT in the on-line reorganization process of the present invention, it should be noted that it is possible to reduce the time and space overheads of the TRT. First, it should be noted that the TRT on a partition or database is only required if a reorganization process is in progress. Thus the TRT may be designed to be transient in nature. Only once the reorganization process starts, a log analyzer, known in the art, or other TRT maintenance mechanism, will begin noting relevant updates in the TRT.

It is also possible to reduce time overheads by forestalling the reorganization process until all active transactions have completed. This ensures that all relevant updates are present in the TRT before the fuzzy traversal begins.

A further means for reducing the TRT overheads is possible when the database is subject to strict 2PL. In those instances, the tuples corresponding to pointer deletes in the TRT can be deleted as soon as the transaction that logged them completes, i.e., aborts or commits the transaction. An abort indicates the reference was re-inserted and a commit means the reference was in fact deleted from the parent object. Moreover, when a transaction that deleted a reference from R to O commits, all tuples, if any, in the TRT that correspond to the insertion of the reference from R to O can also be deleted.

Deleting these tuples is valid because until the transaction completed, no other transaction could read or write to the object with the deleted reference. Thus if the transaction commits to a delete then there is no concern that the traversal missed a parent. Furthermore, any insert reference that exists at the time a delete transaction commits, must have been instroduced before the delete transaction began. Thus the delete transaction supersedes and it is valid to delete all tuples with that reference.

On the other hand if the delete transaction was aborted, we would like to know that a parent still exists that may have been missed by the fuzzy traversal. Furthermore, if after the delete is confirmed another transaction re-inserts the reference that insertion will be separately logged in the TRT as an insert pointer. Thus the insertion remains in the TRT.

As noted, though, this is only valid if 2PL is strictly followed. If transactions do not follow strict 2PL, a reference deleted by a transaction T may have been seen by another transaction T' which may reinsert the reference after T commits. Thus, for the non-2PL case, TRT tuples corresponding to deleted pointers may not be purged after the transaction that deleted the pointer completes. They may only be purged as stated above, during the process of determining the exact parents.

Alternative Phase Two: Incremental Updating

Figure 4:
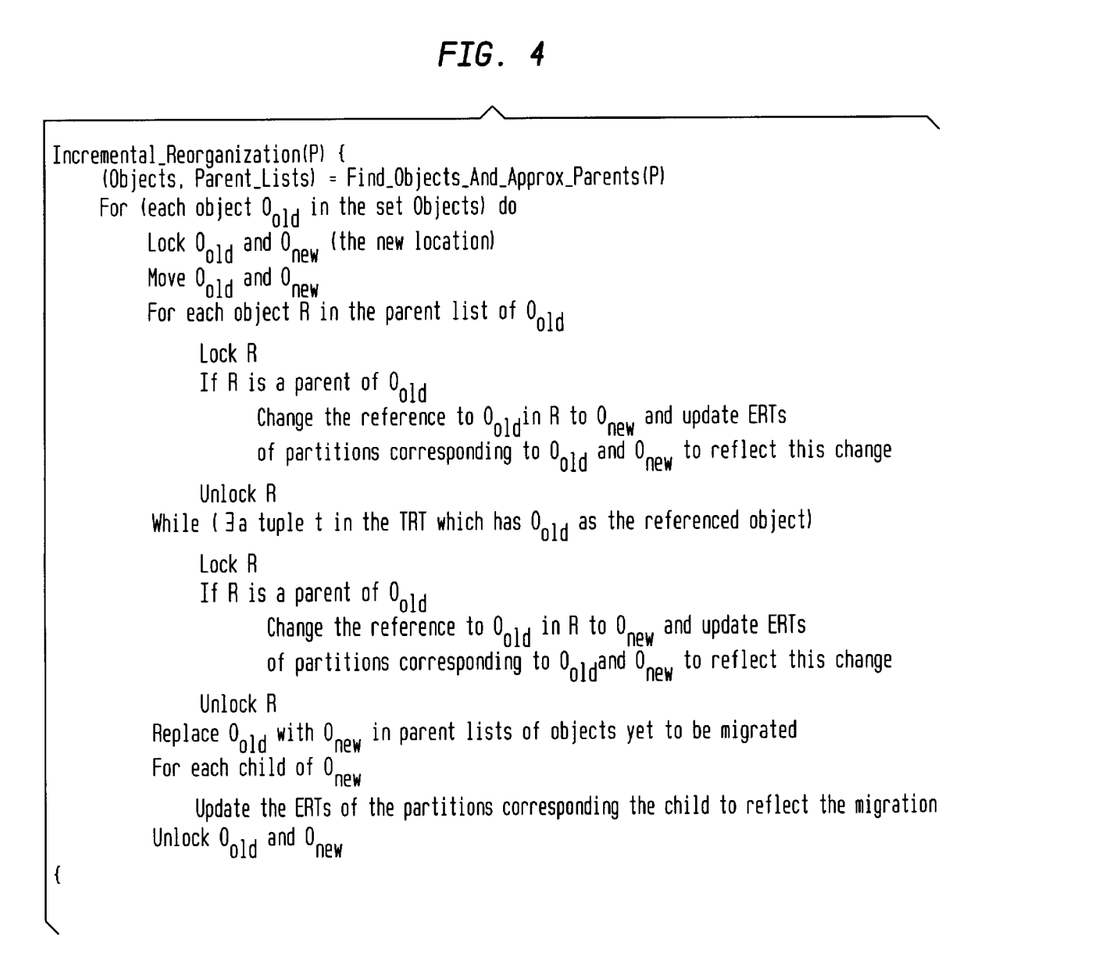
FIG. 4 illustrates the pseudocode for an alternative embodiment of the present invention wherein parents of a migrating object are separately locked, updated and released.

As described above, after the approximate parents of each migrating object are identified, they are locked before the object is relocated. However, for objects with a large number of parents, this could prove to be too restrictive as a substantial portion of the database may get locked. Accordingly, in a further embodiment of the present invention and as shown in pseudocode in FIG. 4 and by the flowchart of FIG. 7, rather than obtaining a lock on all the approximate parents of an object, the object being migrated is locked in both the old and the new locations, block 701. While the object has not migrated yet, the lock on the new location is necessary to prevent any transaction on the new location. Since a new parent pointing to the new location may exist, we want to avoid a circumstance where a transaction is directed to the new location for the object, but instead finds something else.

Figure 7:
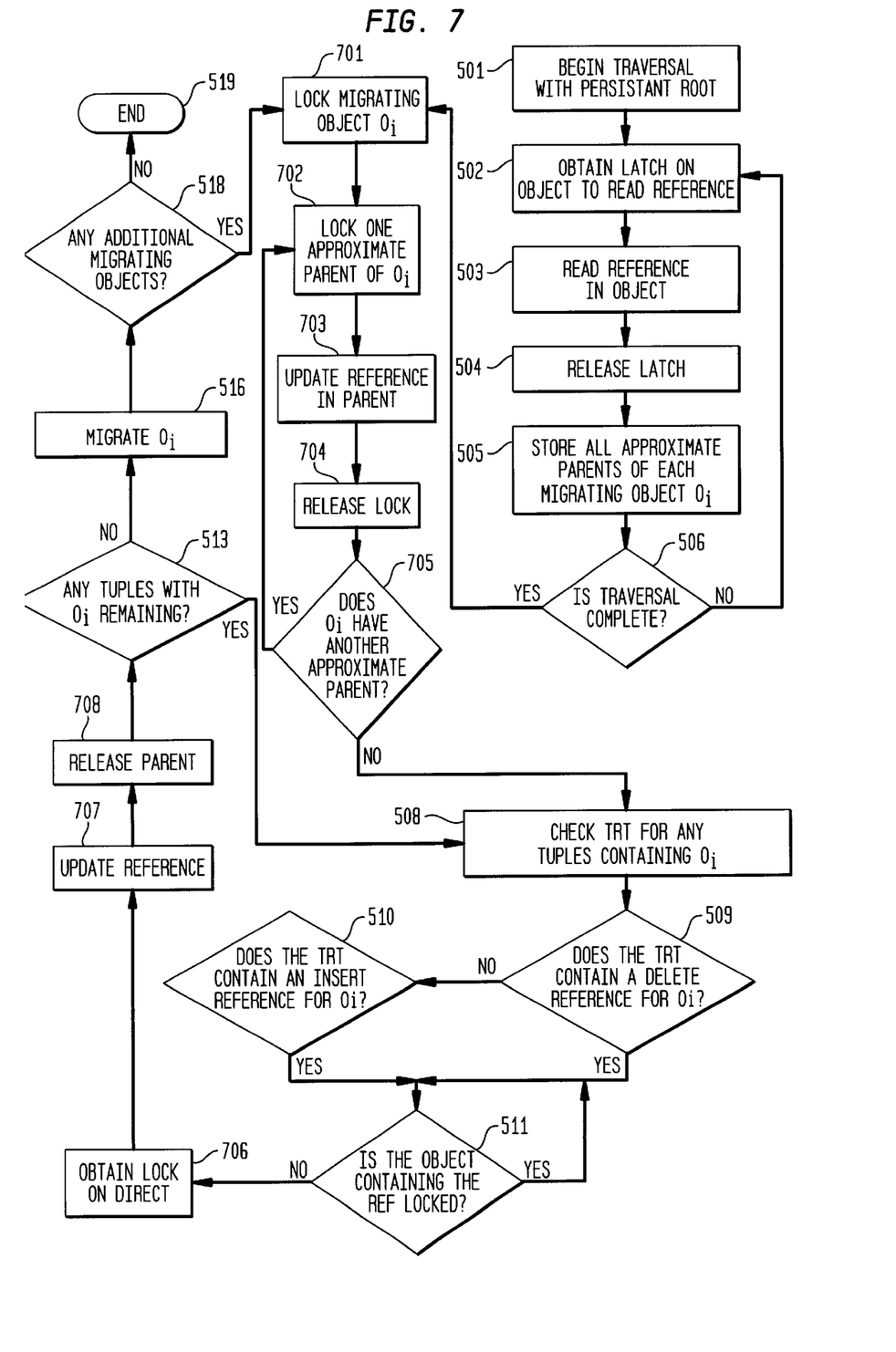
FIG. 7 is a flowchart of another embodiment of the present invention where the number of concurrent locks are reduced by locking the migrating object and only one parent at a time.

With the migrating object locked, each parent to that object is locked, one at a time, block 702, updated with the new location, block 703, and released, block 704. Only after the lock on a parent is released is another parent locked and updated as indicated by decision block 705 and the loop back to block 702.

Since in this embodiment the migrating object is locked, no transaction can obtain a lock on it. Transactions can however copy references to both $O_{new}$ and $O_{old}$ into other objects. We can ignore new references to $O_{new}$ since they will be correct as soon as the object is released, which is after relocation. New references to $O_{old}$ will be detected using the TRT as described earlier and shown in blocks 508, 509, 510, 511, 706, 707 and 708. With this embodiment, locks on no more than two distinct objects are held at any point in time.

However, in the event of a system failure it is possible that a migrating object O, may have one parent which references $O_{old}$ and another parent which references $O_{new}$. In other words, only some, but not all of the parents were updated prior to the system failure. To address this concern, $O_{old}$ and $O_{new}$ need to be locked before transactions are allowed to start execution. The reorganization process can then be restarted.

In addition, the migrating object may have two references that do not match. As a result any transaction that attempts to compare references will obtain an erroneous result. Thus, this alternative embodiment is valid only if transactions are prohibited from comparing references without obtaining locks on the referenced objects. Since the referenced object is locked there will be no comparison until all parents are updated with the correct references.

Recognizing Objects Created After Start of Reorganization

As described above, the online reorganization process of the present invention operates to migrate objects created before the reorganization process begins to execute. In a further embodiment of the present invention even objects created after reorganization begins will be properly migrated. To achieve this task the TRT must be augmented to include all objects created after reorganization. The object must be added to the TRT before a reference to the newly created object is inserted into any object.

In addition, the reorganization process should be designed to repeat itself until the TRT is empty. Consequently, when the reorganization process terminates all newly created objects will have been migrated.

Restart and Recovery

To ensure that aborts of transactions and restart recovery do not have to do anything special to keep the ERT consistent, the updates to the ERT, made by the log analyzer, which records each insert and delete of a pointer, should also be logged. This logging is performed as though these updates were made by the original transaction whose log is being analyzed. See L. Amsaleg, et al., "*Efficient Incremental Garbage Collection for Client-Server Object Database Systems,*" supra.

Alternatively, if the logging overheads for the ERT are perceived to be excessive, one can choose not to log updates to ERT. However, with this approach and in the event of a system failure the ERT would have to be reconstructed at restart recovery, which requires a complete scan of the database. An intermediate solution is to checkpoint the ERT periodically by recording the entire ERT as it exists from time to time. During restart recovery the checkpoint can be used to reconstruct the ERT with the logs for pointer deletes and inserts used to update the checkpoint.

A system failure during Find_Objects_And_Approx_Parents would result in the loss of the work performed until the failure, although since it does not obtain any locks on any objects it will never be involved in a cyclic read, i.e. a deadlock. A simple solution to system failures during Find_Objects_And_Approx_Parents is to restart the IRA algorithm on restart recovery. However, if the loss of work is unacceptable, the data structures Traversed_Objects and Parent Lists can be checkpointed periodically. In the event of a failure, the TRT can be reconstructed on the basis of the logs generated after the IRA started.

Optionally, the TRT could also be checkpointed and then only the logs after the checkpoint need to be considered during the TRT reconstruction. In any case, after the TRT is reconstructed, the last checkpoint of the data structures can then be used to reduce the work of Find_Objects_And_Approx_Parents , avoiding traversal of the parts of the graph which have already been traversed.

With respect to the second step of the IRA of the present invention, Find_Exact_Parents and Migrate_Object for each object in the partition, these are performed within a transaction. Therefore, once a call to these functions succeed for an object O, the migration of O is complete. Migrate_Object does not obtain any locks and can not be involved in a deadlock. Find_Exact_Parents has to be reinvoked if it fails due to a deadlock.

After a system failure during the second step, the objects that have not yet been migrated need to be migrated. If Traversed_Objects and Parents Lists are checkpointed after the completion of the first step, then the TRT can be reconstructed after a system failure by performing a scan of the system logs and the second step (to migrate remaining objects) can be started right away after recovery from failure. If the work done in the first step is lost during a system failure, IRA should be started afresh for the objects yet to be migrated.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for on-line reorganization of at least a part of an object-oriented database containing physical references to one or more objects within said part of said database migrating from an old physical location to a new physical location, said method comprising the steps of:

performing a fuzzy traversal on said database without locking any objects other than to obtain a temporary latch of an object while a reference contained therein is read;

releasing said latch immediately after reading said reference in said object;

separately for each of said migrating objects, identifying during said fuzzy traversal all approximate parents of each of said migrating objects, each of said approximate parents being an object containing a reference to a migrating object;

identifying all objects to which a reference to one of said migrating objects is inserted or deleted by a transaction occurring on objects during said fuzzy traversal, each of said objects referred to respectively as an inserted parent and a deleted parent;

for each of said migrating objects, obtaining a write lock on each of its approximate parents;

for each of said migrating objects, obtaining a write lock on said inserted parents;

for each of said migrating objects, updating the reference to said migrating object found in each of said write locked objects;

for each of said migrating objects, relocating said migrating object to said new physical location; and for each of said migrating objects, releasing each of said write locked objects.

2. The method of claim 1 wherein said sequence of steps of obtaining write locks on approximate parents, obtaining write locks on inserted parents, updating references, relocating said migrating object and releasing said write locks, is separately performed for one of said migrating objects at a time.

3. The method of claim 1 further comprising the step of maintaining a first list of approximate parents for each of said migrating objects.

4. The method of claim 1 wherein said part of said database is the entire database and said fuzzy traversal begins with a persistent root of said database.

5. The method of claim 1 wherein said part of said database is a first partition of a partitioned database, said first partition containing at least one migrating object, further comprising the step of maintaining an External Reference Table ("ERT") for said first partition, said ERT of said first partition comprised of a list of objects having at least one parent from at least one other partition of said database, said parents referred to herein as inter-partitional parents, said fuzzy traversal is performed on said first partition beginning with each of said objects listed in said ERT of said first partition.

6. The method of claim 5 wherein said at least one of said objects listed on said ERT of said first partition is a migrating object, referred to herein as a root migrating object, further comprising the step of including among said approximate parents of said root migrating object said corresponding inter-partitional parents as indicated by said ERT.

7. The method of claim 1 wherein said part of said database is a first partition of a partitioned database, said first partition containing at least one migrating object, wherein said step of performing a fuzzy traversal of said first partition further comprising the step of identifying said objects of said partition from the object allocation information of said database and performing said fuzzy traversal on said identified objects.

8. The method of claim 1 further comprising the step of maintaining a Temporary Reference Table identifying each of said inserted parents and deleted parents, said Temporary Reference Table comprising at least one tuple, each of said tuples identifying one of said inserted parents or one of said deleted parents to a migrating object.

9. The method of claim 8 wherein said step of identifying all inserted references and deleted references of a migrating object continues until said step of releasing said write locked objects, further comprising following said step of updating, but before the step of releasing said write locked objects, the steps of:

determining whether any additional inserted parents or deleted parents of said migrating object were added to said Temporary Reference Table for which a write lock was not obtained;

obtaining a write lock on each of said inserted parents added to said Temporary Reference Table;

releasing said write locks on any object which contains a reference to a deleted parent;

updating said references in said inserted parents added to said Temporary Reference Table; and repeating said determining, obtaining, releasing and updating steps of this claim 9 until no additional inserted parents and deleted parents for said migrating object are added to said Temporary Reference Table.

10. The method of claim 8 wherein said Temporary Reference Table is only maintained during said on-line reorganization of said part of said database.

11. The computer system of claim 10 wherein said database is partitioned into at least two partitions, further comprising a separate third data structure type for each of said partitions, said third data structure type referred to as an External Reference Table ("ERT"), said ERT of each of said partitions comprising a list of objects in said partition having at least one parent from another one of said partitions of said database, said parent referred to herein as an inter-partitional parent, wherein said software operating on said computer system includes instructions for independently performing said fuzzy traversal on each of said partitions, and instructions for said fuzzy traversal of one of said partitions to begin with each of said objects listed in said ERT of said traversed partition.

12. The method of claim 8 wherein said database is constrained by two-phase locking such that any active transaction involving an object prevents any other transaction on said action until said active transaction completes, further comprising the step of deleting from said Temporary Reference Table said identity of each of said deleted parents as the transaction which deleted said reference from said deleted parent, completes.

13. The method of claim 1 further comprising the steps of:
  determining prior to said step of performing a fuzzy traversal whether there are any active transactions acting on said part of said database; and
  waiting for said active transactions to complete before performing said fuzzy traversal.

14. The computer system of claim 13 further comprising software operating on said computer system for including said inter-partitional parents of an object listed on an ERT which is also a migrating object, among said approximate parents of said migrating object listed on said ERT.

15. The method of claim 1 wherein said database is not constrained by two phase locing, further comprising the steps of:
  identifying each active transaction which results in a delete reference; and
  stalling said fuzzy traversal at said object until said active transaction completes.

16. The method of claim 1 wherein one of said migrating objects has only one parent, said one parent being an inserted parent, further comprising the step of repeating said fuzzy traversal of said part of said database prior to said step of obtaining a write lock on each of said migrating object's approximate parents.

17. A method for on-line reorganization of an object-oriented database containing physical references to one or more objects migrating from an old physical location to a new physical location, said method repeating the following steps separately for each of said migrating objects:
  performing a fuzzy traversal on said database without locking any objects other than to obtain a temporary latch of an object while a reference contained therein is read,
  releasing said latch immediately after reading said reference in said object;
  separately for each of said migrating objects, identifying during said fuzzy traversal all approximate parents of each of said migrating objects, each of said approximate parents being an object containing a reference to a migrating object;
  identifying all objects to which a reference to one of said migrating objects is inserted or deleted during said fuzzy traversal, each of said objects referred to respectively as an inserted parent and a deleted parent;
  selecting one of said migrating objects;
  obtaining a write lock on said migrating object;
  obtaining a write lock on one of said approximate parents of said selected migrating object;
  if said write locked approximate parent is not a deleted parent then updating the reference to said selected migrating object found in said write locked approximate parent;
  releasing said write locked approximate parent;
  repeating said obtaining, updating and releasing steps on said approximate parents until all references in each of said approximate parents of said migrating object has been updated, and said write lock o said approximate parents have been released;
  obtaining a write lock on said inserted parents of said selected migrating object;
  updating the reference to said selected migrating object found in said write locked inserted parent;
  releasing said write lock on said updated inserted parent;
  repeating said obtaining, updating and releasing steps on said inserted parents until all references in each of said inserted parents of said migrating object have been updated, and said write lock to said inserted parents have been released;
  relocating said selected migrating object to said new physical location; and
  releasing said write lock on said selected migrating object.

18. A computer implemented system for performing on-line reorganization of an object-oriented database containing physical references to one or more objects migrating from an old physical location to a new physical location, comprising:
  software operating on said computer system for performing a fuzzy traversal on said database without locking any objects other than to obtain a temporary latch of an object while a reference contained therein is read;
  a first data structure for maintaining a list of approximate parents corresponding to each of said migrating objects identified during said fuzzy traversal, each of said approximate parents being an object containing a reference to a migrating object;
  a second data structure for maintaining a list of all inserted parents, deleted parents and the type of parent, whether inserted or deleted, corresponding to each of said migrating objects identified during said fuzzy traversal, wherein an inserted parent is an object to which a reference to one of said migrating objects is inserted and a deleted parent is an object from which a reference to one of said migrating objects is deleted;
  software operating on said computer system for write locking said approximate parents;
  software operating on said computer system for write locking said inserted parents and deleted parents;
  software operating on said computer system for updating the references to said migrating objects which are found in said write locked approximate parents and inserted parents;
  software operating on said computer system for releasing said write locks on said approximate parents and said inserted and deleted parents; and
  software operating on said computer system for relocating said migrating object to said new physical location.

* * * * *